(12) United States Patent
Upton

(10) Patent No.: US 8,218,052 B2
(45) Date of Patent: Jul. 10, 2012

(54) HIGH FRAME RATE HIGH DEFINITION IMAGING SYSTEM AND METHOD

(75) Inventor: Wayne A. Upton, Santa Barbara, CA (US)

(73) Assignee: Iconix Video, Inc., Santa Barbara, CA (US)

( * ) Notice: Subject to any disclaimer, the term of this patent is extended or adjusted under 35 U.S.C. 154(b) by 0 days.

(21) Appl. No.: 10/793,562

(22) Filed: Mar. 4, 2004

(65) Prior Publication Data
US 2004/0174439 A1 Sep. 9, 2004

Related U.S. Application Data

(60) Provisional application No. 60/452,646, filed on Mar. 7, 2003.

(51) Int. Cl.
*H04N 3/14* (2006.01)
*H04N 5/228* (2006.01)

(52) U.S. Cl. ........................ 348/312; 348/222.1; 348/302

(58) Field of Classification Search ................... 348/312, 348/296, 322, 350
See application file for complete search history.

(56) References Cited

U.S. PATENT DOCUMENTS

| | | | | |
|---|---|---|---|---|
| 4,910,599 A * | 3/1990 | Hashimoto | ................ | 348/240.2 |
| 5,262,871 A | 11/1993 | Wilder et al. | | |
| 5,452,004 A | 9/1995 | Roberts | | |
| 5,668,597 A * | 9/1997 | Parulski et al. | ................ | 348/350 |
| 5,841,471 A * | 11/1998 | Endsley et al. | ............ | 348/231.6 |
| 6,614,477 B1 * | 9/2003 | Lee et al. | ....................... | 348/312 |
| 2002/0186312 A1 | 12/2002 | Stark | | |
| 2003/0025830 A1 * | 2/2003 | Perry | ............................ | 348/441 |
| 2003/0038883 A1 * | 2/2003 | Takahashi et al. | ......... | 348/207.1 |
| 2004/0081437 A1 * | 4/2004 | Asada et al. | .................. | 386/131 |
| 2004/0155977 A1 | 8/2004 | Clark, II et al. | | |

FOREIGN PATENT DOCUMENTS

| | | |
|---|---|---|
| EP | 1168833 A2 | 6/2001 |
| JP | 9224196 | 8/1997 |
| JP | 11150703 | 6/1999 |
| JP | 11205731 | 7/1999 |
| JP | 2002305670 | 10/2002 |
| WO | WO 02/39737 * | 5/2002 |

OTHER PUBLICATIONS

Sony ICX204AL Data Sheet, pp. 1-22.
SMPTE Standard, Jan. 4, 2001, SMPTEM-2001, pp. 1-14.
VESA Standards, Sep. 17, 1998, Monitor Timing Specifications Version 1.0, Revision 0.8, pp. 1-36.
Japanese Office Action pertaining to Patent Application No. 2005-518596 mailed Mar. 3, 2008, and corresponding English translation of same.
Japanese Office Action pertaining to Patent Application No. 2005-518596 mailed Nov. 25, 2008.
Supplemental European Search Report pertaining to European Patent Application No. 04718053.4/PCT/US2004006850 mailed Aug. 17, 2009.

* cited by examiner

*Primary Examiner* — Luong T Nguyen
(74) *Attorney, Agent, or Firm* — Myers Andras LLP; Joseph C. Andras

(57) ABSTRACT

A high frame rate high definition imaging system and method are disclosed. An imager is clocked asynchronously to a desired output video clock. During a frame cycle, data held in a first portion of the pixel array in the imager is clocked out of the imager using an imager clock signal, and data held in a second portion of the pixel array is bypassed. The imager data is subsequently converted to a higher video clock rate and output as desired video data.

23 Claims, 5 Drawing Sheets

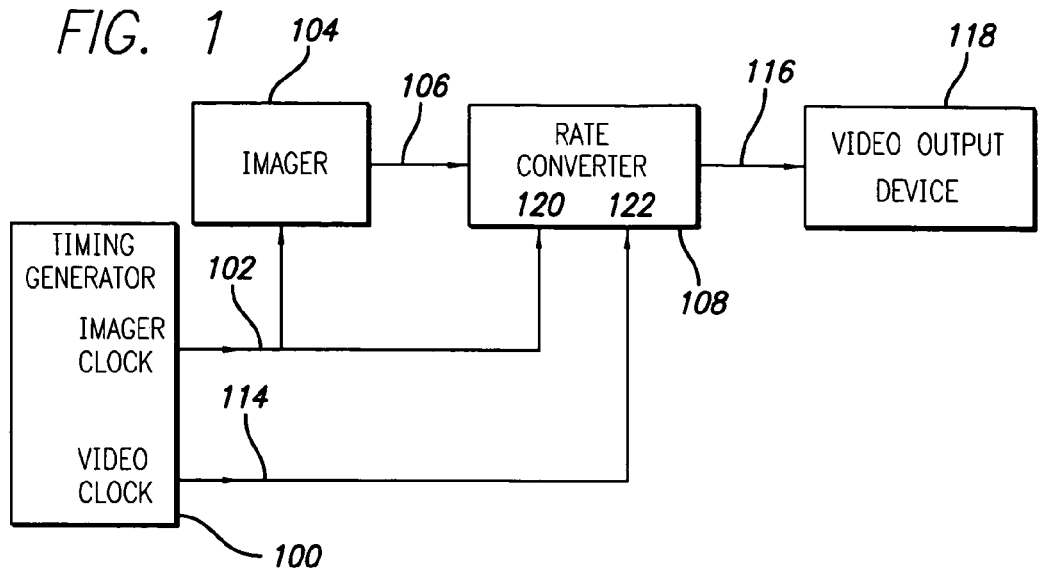
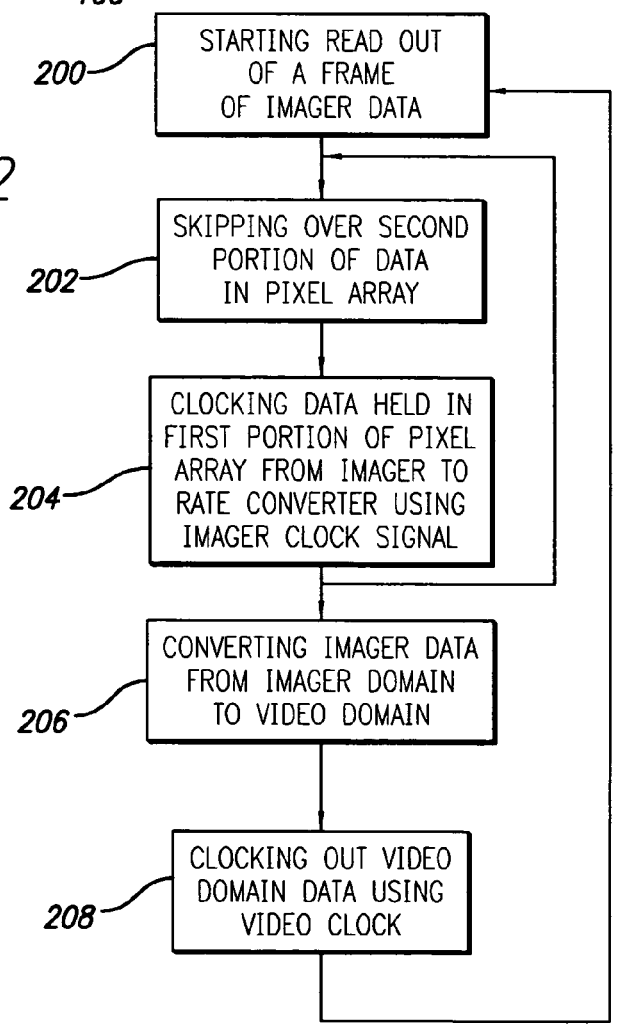

HIGH FRAME RATE HIGH DEFINITION IMAGING SYSTEM AND METHOD

RELATED APPLICATION INFORMATION

This patent application claims the benefit pursuant to 35 USC §119(e) of the priority date of U.S. Provisional Patent Application Ser. No. 60/452,646, filed on Mar. 7, 2003, the entire contents of which are hereby expressly incorporated by reference.

BACKGROUND OF THE INVENTION

1. Field of the Invention

The present invention relates generally to imaging systems and methods. More particularly, the present invention relates to high definition imaging systems and methods.

2. Description of the Prior Art and Related Background Information

Electronic image sensors such as charge-coupled devices (CCDs) are well known. In a CCD imager, image information associated with each pixel in a pixel array is accumulated as electrical charge which is read out of the imager as image data. As a result CCDs, and other electronic imaging devices, require a series of precise timing pulses to sequentially read the image data from the image sensor. These precise timing pulses are provided to the electronic image sensor at a particular clock frequency. This read out clock rate will determine the amount of image data (number of pixels) which can be read out of the imager per unit time. This clock rate therefore limits the image resolution for a given frame rate.

High resolution, high frame rate imaging systems are becoming important for a number of applications such as HDTV cameras, medical imaging and other applications where high quality images are needed. For such high frame rate and high definition imaging, very high read out clock rates are needed. Indeed, the clock frequencies which are needed to transfer the charge from all the pixels of the imager within the allowed time tend to be near or above the limits of the speed at which charge can be effectively transferred within conventional CCD imager designs. Similar constraints exist for other electronic imagers such as CMOS image sensors. Also, when fabricating image sensors with high resolution, manufacturers are particularly cautious to prevent noise and distortion that may result during read out. As a result, high resolution high frame rate electronic imagers typically require special designs which can be very expensive relative to imagers adapted to run at lower clock rates. As a specific example, a typical high-definition (HD) CCD sensor, such as the Sony ICX204AL, which is adapted for machine vision applications and is rated for only 15 frames per second in standard progressive read-out mode is a fraction of the cost of a high-definition (HD) CCD sensor that can run at a clock rate adapted for standard frame rates (50 or 60 frames per second).

Therefore, a need exists for a low cost imager capable of providing high definition images at high frame rates.

BRIEF SUMMARY OF THE INVENTION

In a first aspect the present invention provides an imaging system comprising a timing generator providing an imager clock signal having an imager clock rate and a video clock signal having a video clock rate greater than the imager clock rate. The imaging system further comprises an imager having an imager clock input receiving the imager clock signal and a data output. The imaging system further comprises a rate converter, coupled to the data output of the imager and to the timing generator which receives the video clock signal and a signal synchronous to the imager clock signal. The rate converter receives imager data at a rate synchronous to the imager clock rate and outputs video data at the video clock rate.

In a preferred embodiment of the imaging system, the imager comprises a pixel array holding pixel data representative of an image captured by the imager. The pixel array has a first portion and a second portion and the timing generator generates a sequence of timing signals to control the imager to skip over the second portion of the pixel array and clock the first portion of the pixel array from the imager to the rate converter. The timing generator may generate horizontal timing pulses and vertical timing pulses, and the horizontal timing pulses will correspond to the imager clock rate. The imager clock signal and video clock signal are asynchronous to one another. The first portion of the pixel array may comprise desired active pixels and the second portion of the pixel array may comprise inactive optical black reference and dummy pixels. More specifically, the second portion of the pixel array may comprise a combination of undesired active pixels and inactive pixels, and the first portion may comprise desired active pixels of the pixel array. The imager may be a CCD sensor of the type where electric charge is accumulated by the imager for the pixels of the pixel array. The electric charge associated with the second portion of the pixel array may be shifted out of the imager simultaneously for groups of plural rows. For example, one or more horizontal and vertical timing pulses may control the accumulation of electric charge in a transfer portion of the imager and the horizontal transfer clock controls the transfer of charge corresponding to plural rows of pixel data out of the imager simultaneously.

In a preferred embodiment the timing generator may comprise an imager clock generator circuit block outputting an imager clock, a video clock generator circuit block outputting a video clock, a master synchronization circuit block, and an imager timing logic block coupled to the imager clock generator and master synchronization circuit blocks and outputting the imager clock signal at the imager clock rate. The master synchronization circuit block is preferably coupled to the video clock generator circuit block and receives the video clock. The rate converter preferably comprises a memory, for receiving and temporarily storing image data from the imager, and rate converter control logic. The rate converter control logic preferably comprises a memory control circuit for controlling the writing and reading of data to and from the memory. The memory control circuit is coupled to the timing generator and receives the video clock signal and a signal synchronous to the imager clock signal. The rate converter control logic preferably further comprises video timing logic coupled to the memory control circuit and to the timing generator and receiving the video clock signal. The video timing logic controls the memory control circuit to interrupt read out of data from the memory during blanking intervals of the output video data. The rate converter control logic preferably further comprises a video output generator coupled to the memory and the video timing logic. The video output generator receives output data from the memory and inserts blanking data during blanking intervals during which the read out of the memory is suspended and outputs video data with actual pixel data and blanking data at the video clock rate. The output video data may, for example, be provided in a VESA standard timing or in a SMPTE HDTV standard timing.

According to another aspect the present invention provides an increased frame rate imaging system comprising an image sensor having an array of pixels, including inactive reference and dummy pixels, an output for providing image data, and one or more control inputs for receiving read out timing control signals. The increased frame rate imaging system further comprises a timing generator providing timing pulses to the control inputs of the image sensor to control the read out of the image sensor to skip over at least some of the inactive and pixels of the pixel array, and clock out image data from a desired portion of the pixel array, thereby effectively increasing the frame rate of the image sensor.

In a preferred embodiment of the increased frame rate imaging system the timing pulses comprise vertical and horizontal timing pulses including a series of consecutive vertical transfer pulses to skip over plural rows of dummy and/or reference and/or unwanted active pixels of the pixel array. The timing pulses may also comprise a vertical transfer pulse prior to the end of a line of a desired portion of the pixel array to skip over plural dummy and/or reference, and/or unwanted active pixels at the end of the line. The image sensor may be a CCD imager of a type which comprises an accumulation area and a transfer area associated with the pixel array. The timing pulses may comprise vertical and horizontal timing pulses to transfer the image data from the accumulation area to the transfer area and subsequently out of the imager, wherein plural rows of unused pixel data are transferred into the horizontal transfer area using the vertical timing pulses and clocked out together using the horizontal timing pulses.

According to another aspect the present invention provides a method of providing high definition video data using an imager operating at a lower clock rate. The method comprises clocking image data from the imager using an imager clock signal at an imager clock rate. The method further comprises converting the imager data to video data at a video clock rate greater than the imager clock rate.

In a preferred embodiment of the method, converting the imager data to video data comprises buffering the image data in a memory. The imager data is written into the memory at the imager clock rate or at a rate synchronous to the imager clock rate, and the data is read out of the memory at a different clock rate, asynchronous to the imager clock rate. Converting the imager data to video data preferably further comprises inserting blanking data, corresponding to blanking intervals of the video data, into the imager data. Converting the imager data to video data preferably further comprises suspending read out of data from the memory during said inserting of blanking data. The imager clock signal is asynchronous to the video data. The video data may, for example, be output in a VESA standard timing, or in a SMPTE HDTV standard timing.

In another aspect the present invention provides a method of increasing the frame rate of an imager having a pixel array with first and second portions. The method comprises skipping over the second portion of the pixel array and clocking image data held in the first portion of the pixel array from the imager using imager control timing signals.

In a preferred embodiment of the method, skipping over the second portion of the pixel array comprises providing a series of consecutive vertical transfer pulses to the imager to skip over plural rows of image data in the second portion. Skipping over the second portion of the pixel array may also comprise providing a vertical transfer pulse prior to the end of a line of the pixel array to skip over pixels at the end of the line. The first portion of the pixel array may comprise the desired active and desired inactive pixels of the array and the second portion of the pixel array may comprise inactive pixels and any undesired active pixels. The inactive pixels generally correspond with blanking intervals of a standard video timing scheme. For example, the standard video timing scheme may be a VESA standard timing, or a SMPTE HDTV standard timing. The imager may be a CCD imager and the method may further comprise clocking out charge corresponding to the second portion of the pixel array.

These and further aspects and features of the invention will be appreciated from the following detailed description.

BRIEF DESCRIPTION OF THE DRAWINGS

FIG. 1 is a block diagram of a high frame rate high definition imaging system in accordance with the present invention;

FIG. 2 is a flowchart of an embodiment of a method of providing a high frame rate high definition image according to the present invention;

DETAILED DESCRIPTION OF THE PREFERRED EMBODIMENTS

Figure 3:
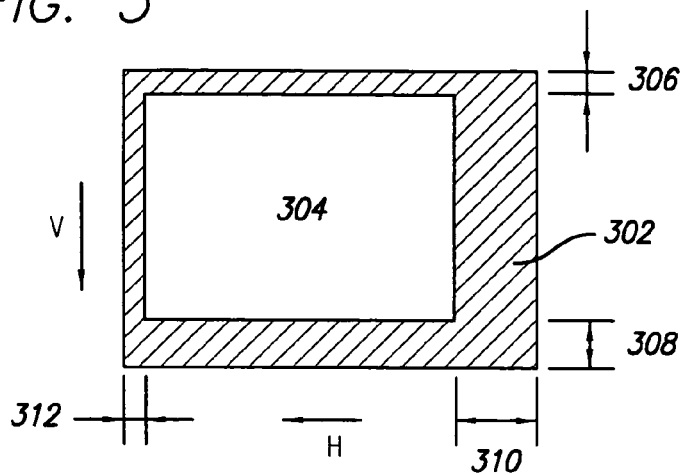
FIG. 3 is a diagram type illustration showing the active and inactive pixels in an exemplary imager.

Referring to FIG. 1 an embodiment of an imaging system according to the present invention is illustrated in a block schematic drawing. The present invention preferably employs a standard low cost high resolution imager 104 having a relatively low nominal clock rate. For example, high resolution but relatively low clock rate CCD image sensors adapted for machine vision applications are commercially available at relatively low cost and may be employed for standard imager 104. Other low cost electronic imagers, such as CMOS imagers, may also be employed, however. The present invention converts the imager data at a relatively low clock rate to a higher video clock rate and outputs the higher clock rate video data to video output device 118. As a result the present invention provides a low cost high frame rate high definition imaging system.

More specifically, as shown in FIG. 1, a timing generator 100 provides a first set of timing signals 102 at an imager clock rate (imager clock) to imager 104. The first set of timing signals synchronize imager 104 operation, and clock imager data 106 out of imager 104 into pixel clock rate converter 108. Timing generator 100 also provides a second set of timing signals 114 at a video clock rate (video clock). As will be discussed in detail below, the first and second set of timing signals are generally not synchronous. This allows the read out of imager 104 to be optimized without being constrained to the clocking scheme of the video output device 118. This avoids significant inefficiencies in imager read out associated with the video clocking scheme. This allows the clock rate of imager clock 102 to be less than the clock rate of video clock 114 allowing use of a less expensive lower clock rate imager 104. Rate converter 108 typically increases the clock rate and synchronizes the imager data to the video device clocking scheme. Rate converter 108 includes a first clock input 120 coupled to imager clock 102, and a second clock input 122 coupled to video clock 114. Imager data 106 is input to rate converter 108 at a rate synchronous to the imager clock rate. This rate may be the actual imager clock rate, or a rate synchronous (often an integer multiple) to the imager clock rate, which may necessarily differ due to signal processing techniques, such as "double-sampling" for time-correction of half-pixel offset data in CCD prism systems. Control logic and an image data buffer memory in rate converter 108 temporarily store and convert imager data 106 from this imager domain clocking scheme to a video domain clocking scheme. The converted data is then output from rate converter 108 as video data 116. Once the imager data 106 is converted to video data 116, the video data 116 is transmitted to a video output device 118 at a standard video clock rate and timing scheme for the application. For example, the video output device may be a display, video recorder, or other high definition video device. Video output device 118 will typically operate at a high definition high frame rate timing standard such as defined by VESA (Video Electronics Standards Association) for computer monitor type displays or SMPTE (Society of Motion Picture and Television Engineers) standards for High Definition TV quality displays (HDTV).

Referring to FIGS. 1 and 3, the control of imager 104 read out using imager clock 102 will be described in more detail in relation to a preferred embodiment. The imager 104 has a pixel array which captures pixel data representative of an image captured by the imager. The imager pixel array for a typical imager contains a first portion which includes the desired image data for the application and a second portion which is not needed. For example, the pixel array for a typical imager includes active pixels and inactive pixels. Inactive pixels include optical black reference pixels and dummy pixels typically adapted for synchronous read out with a video clock. More specifically, the standard method for reading an imager such as a CCD for video applications involves horizontal and vertical transfer pulses that are synchronous with the video pixel clock and horizontal/vertical sync (which are dictated by the video output device). Inactive optical black reference pixels and lines and dummy bits and lines are provided in imagers to allow for optical black signal reference and assist in synchronizing the imager output to standard video clocking schemes which all have idle time, or dead time, associated with blanking intervals. This results in an inefficiency of time in clocking out the unnecessary, redundant, or unused optical black reference pixels and dummy pixels built into the imager. In the asynchronous clocking scheme of the present invention these dummy lines, dummy pixels, and many of the reference pixels and lines are not needed.

A specific example of such an imager pixel array with active and inactive pixels is shown in FIG. 3. FIG. 3 shows the orientation and size of the active pixels 304 and optical black and dummy pixel portions 302 of a typical CCD, and the direction V (vertical) and H (horizontal)) the data is shifted out of the imager; with the top line of the image positioned at the bottom of FIG. 3. The extra data 302 around the active area 304 is normally clocked out. This extra data 302 typically includes top rows of optical black reference and dummy vertical pixels 308, bottom rows of black reference and dummy vertical pixels 306, leading columns of black reference and dummy horizontal pixels 312 (which must always be clocked out for a desired line), and trailing columns of black reference and dummy horizontal pixels 310. The extra data 306, 308, 310, and 312 can represent a substantial amount of inactive, undesired, unnecessary, or unused "data" transfer time that occurs during each frame period.

In the present invention only the first desired portion of the pixel array is clocked out. The first portion comprises desired active pixels 304, the portion of 312 the must be clocked out by association to those lines, and optionally some extra inactive reference pixels. The second portion comprises the combination of any undesired active pixels (e.g., pixels not needed due to a different aspect ratio of the video output) and some or all of the remaining inactive pixels 302. The first set of timing signals 102 control the logic of imager 104 to clock out the first portion of its pixel array, while bypassing much of the second portion of the pixel array. Since the first set of timing signals are optimized for high speed read out of imager 104 and are in general not synchronous to the video clock signals a nonstandard sequence of vertical and horizontal transfer pulses may be used to jump over the undesired pixels corresponding to the second portion. A specific example of timing signals adapted for optimal read out of a commercially available CCD imager is described below in relation to FIGS. 4-5. The first portion of the pixel array data thus is output as imager data 106 at a frame rate substantially higher than the nominal frame rate of imager 104. Also, the nominal timing specified by the imager manufacturer for the horizontal or vertical register transfer may not be the most efficient, for example, assuming pulse widths longer than necessary, and this rate may be increased over a nominal value to a higher rate if needed for an even further frame rate increase.

Next the operation of the rate converter 108 will be described. Video output device 118 will have a specific video timing format for the particular application. All such accepted video timing formats have significant idle time corresponding to blanking intervals. As noted above, the standard method for reading a CCD or CMOS imager for video applications involves horizontal and vertical transfer pulses that are synchronous with the video pixel clock and horizontal/vertical sync and usually the video clock signals are used. In accordance with the present invention, imager 104 does not operate synchronously to this output video clocking scheme. However, the video output data 116 must be synchronized to the video clocking scheme to be useful for the video output device 118. This requires a rate converter 108 to synchronize the image data to the desired video clocking scheme. Control logic and a buffer memory in the rate converter convert the imager domain clock rate to a video domain clock rate and insert blanking data for the video blanking intervals. The clock rate in the (asynchronous) video domain will thus be a standard video clock rate higher than the clock rate in the imager domain. The video data 116 clocked from the rate converter 108 at this standard video clock rate and clocking scheme is provided to video output device 118 (which may also be clocked by the video clock 114). The imager domain clocking scheme in turn operates independently and continuously, i.e. even during idle blanking intervals of the video display clocking scheme (video domain clock), maximizing the rate of transfer of image data from the imager for a given imager clock rate.

The advantages of using the rate converter 108 to allow separate imager and video clocking schemes may best be appreciated by two specific examples of standard video clocking schemes. As a first example, consider the 1280×720 p HDTV standard. The clocking scheme for 720 p HDTV is set out in a published specification, SMPTE 296M, the disclosure of which is incorporated herein by reference. According to one allowed scheme in this standard (system 1 of Table 1 of SMPTE 296M) there are 750 total lines per frame, and 1650 total 74.25 MHz horizontal pixel clocks per line. It also specifies that there are only 720 lines containing active video (or picture information), and in each of those 720 lines, only 1280 clock periods contain active pixels. From this it may be calculated that there are 30 lines (750 minus 720) of the video signal that contain no picture information. (e.g., lines 1-25 and 746-750 are blank). Additionally, for every line that does contain active pixels, 370 (1650 minus 1280) clock periods are either sync or blank time (see SMPTE 296M publication). Therefore, there are 1280×720=921600 picture-contributing clock periods and (750×1650)−(1280×720)=315900 non-picture clock periods. This yields an active picture efficiency of only 74.47%. The remaining portion of the video signal deals with blanking and sync information. The active picture output is "idle" during these times.

To illustrate now the benefit of reducing this inefficiency, using a separate imager clocking scheme and a rate converter, consider a fictional "ideal" imager with no "dummy" or inactive information containing exactly 1280×720 pixels, all of which are active. This imager could still be clocked at 74.25 MHz, with timing gaps in the drive clock corresponding to the blanking time in the video signal, and thus be driven synchronously with the video signal. Now take the case where this "ideal" imager is a relatively low cost lower clock rate imager and, due to its intrinsic physical properties, has severe performance degradation when clocked, for example, above 60 MHz, and at 74.25 MHz, may not produce a usable picture at all. The theoretical minimum frequency to clock out all of these pixels, at 60 frames per second (fps) is 1280×720×60, or 55.296 MHz (which is the same as the active picture efficiency multiplied by the video clock rate). This frequency is suitably below 60 MHz, allowing the imager to still be used for quality 60 fps video. However, this clock is asynchronous to the video signal's 74.25 MHz clock. To allow the imager data to be used as video data, memory storage and data flow management implemented in rate converter 108 re-synchronizes the imager's data with the output video signal, and adds in the requisite blanking or "idle" time. Therefore, simply by removing the need to operate the imager synchronously to the inefficient video clocking scheme, the present invention allows use of a lower cost lower clock rate imager.

Another example is the VESA specification for standard computer monitor timing sequences. The VESA specifications for standard computer monitor timing is a published document, the disclosure of which is incorporated herein by reference. One such standard VESA monitor timing is for the popular 1024×768 at 60 Hz, or "XGA", monitor resolution. The total number of clocks per frame for the XGA standard is 1344×806=1083264. However, only 1024×768=786432 of these are active pixel data. This results in an active picture time efficiency of 72.60%. Were the above described method to be applied to an "ideal" XGA sensor, then the 60 fps pixel clock could be reduced from the specified video signal clock rate of 65.00 MHz. The resultant clock frequency would be 1024×768×60=47.186 MHz (or 0.7260 times 65.00 MHz). Once again a significant reduction in the required imager clock speed is provided allowing a much lower cost imager to be used.

Although these examples assumed an "ideal imager", in practice, imagers do need some extra reference and dummy information, as well as having other transfer minimum timing requirements. This adds inefficiency to the "ideal" situation. However, these can be manipulated and minimized, and the general result of increased active picture efficiency is still present and significant for practical imagers. In this regard, the previous discussion of the read out of imager 104 described a specific method for manipulating the read out of an imager which is very far from "ideal" and eliminating inefficiencies associated with inactive pixel read out to make it much closer to an ideal imager. With an imager which is closer to ideal (less inefficient) a more straight forward imager clocking scheme may be employed and significant advantages will still be obtained.

FIG. 2 schematically illustrates the combined method for providing high frame rate high definition image data in accordance with the invention. More specifically, at 200 the read out of a frame of imager data is initiated by the imager clock 102. At 202, data held in a second portion of an imager pixel array is skipped over (not clocked) by suitable timing pulses. This may comprise skipping over initial undesired rows of pixel data using vertical transfer pulses. At 204, desired image data held in the first portion of an imager pixel array is clocked from the imager to a rate converter at a rate synchronous to the imager clock rate. 202 and 204 are repeated as the first portion is read out skipping over undesired pixels. At 206, the rate converter converts the imager data from the imager domain clocking scheme to the video clock rate and video domain clocking scheme. At 208, the rate converter clocks out the video domain data at a video clock rate as video output data adapted for the application. 206 and 208 will continue at the same time as imager read out 202, 204. The video frame rate may be faster than the imager frame rate, but may be the same as the imager frame rate. Also, while the imager read out method of 202 and 204 will increase the frame rate of the imager from its nominal value, as described above for a more ideal imager such a read out method 202, 204 need not be employed and all or substantially all of the imager data may be clocked out at 204.

Next, referring to FIGS. 3-5, a specific embodiment of the imager read out clocking scheme will be described based upon the Sony ICX204AL CCD which is a VESA 1024×768 standard imager. This imager is quite inefficient and preferably a read out method such as 202, 204 above (FIG. 2) may be employed. For this specific imager the extra data 302 in FIG. 3 (with the top line of the image positioned at the bottom of the diagram) includes one (1) leading dummy row and seven (7) leading rows of reference pixels 308, two (2) trailing rows of reference pixels 306, twenty-nine (29) leading dummy and three (3) leading reference columns of pixels 312 (which must always be clocked out for a desired line), and forty (40) trailing columns of reference pixels 310. (The specifications of the ICX204AL CCD imager are publicly available and the disclosure of these specifications are incorporated herein by reference.) The efficiency of the ICX204AL CCD system using recommended timing in the specifications is thus approximately 72.60%, due to this inactive image data. The present invention uses the entire frame period to clock out only the active data, in conjunction with clocking out as little of the optical black area as possible. This increases the time efficiency to approach 100%, allowing maximum frame rate at a minimum horizontal transfer clock frequency.

Figure 4:
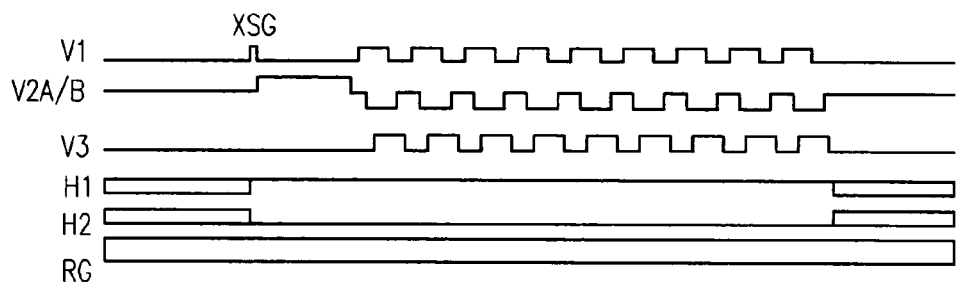
FIG. 4 is a timing diagram illustrating an example of an imager read out timing sequence according to the present invention.

Specifically, FIG. 4 shows a typical timing sequence in detail, for skipping over undesired rows of pixel data at the start of a frame. V1, V2A/B, and V3 denote vertical register transfer clocks, H1 and H2 denote horizontal register transfer clocks, and RG denotes a reset gate clock. These correspond to clocking signal input pins for the ICX204AL imager. The clocking scheme begins with XSG (frame transfer pulse), at recommended pulse width. Immediately following are successive Vφ transfer pulse sequences, with no horizontal transfer clocking. These are to get past any dummy bits and optical black lines 308, and to put the first line of video into the CCD's horizontal shift register. The pulse width of XSG and the Vφ transfer pulse may be as specified for the particular CCD, or may be shortened to a minimum value determined experimentally for finding the fastest implementation. From this point, the required pixels in the first active video line are clocked out, and vertical transfer pulses are immediately sent, the next line beginning immediately.

Figure 5:
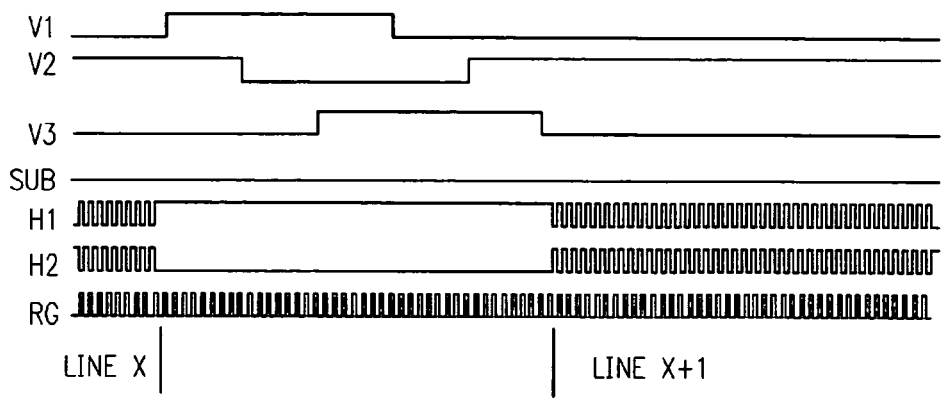
FIG. 5 is a timing diagram illustrating an expanded representation of the imager read out timing sequence illustrating horizontal timing pulses.

Additional typical timing for subsequent lines is shown in FIG. 5, where SUB denotes a substrate clock. Note that the pulse widths in FIG. 5 are shown in greater detail, to emphasize that horizontal clocks H1 and H2 are suspended during the timing of a single vertical transfer pulse sequence of clocks V1, V2, and V3. This is repeated until the final necessary active pixel of the final active line is clocked out, when XSG would immediately be sent, starting the cycle over without delay. Exactly one exposure frame period will have elapsed.

Another feature of the present invention involves handling of residual charge associated with the second portion of the pixel array. During the exposure period of the imager 104, the second, undesired portion of the pixel array will still build up charge that needs to be removed from the imager or the resultant image will be corrupted. Typically, when exposure is complete at the end of an exposure period, the charge from the array of photodiodes (collection region) is transferred into a parallel array of analog storage locations (transfer region). The transfer region uses a shift register circuit receiving timing and transfer pulses to shift the charge from stage to stage and finally out of the register. The normal shifting out of charge is bypassed for the second portion of the pixel array, as described above. The present invention overcomes the potential problem of charge build up by combining plural rows or groups of pixels associated with the second portion of the pixel array in the transfer region and shifting them out of the imager 104 together, thus saving time. More specifically, this transfer out of residual charge may correspond to the initial sequence of horizontal transfer pulses shown in FIGS. 4 and 5 after the sequence of vertical transfer pulses. Once during each frame these vertical transfer pulses will transfer all the undesired rows of pixel data into the transfer section of the CCD which are then clocked out at the same time by one or more sequences of horizontal transfer pulses H1 and H2 to remove the charge. Also, both the undesired last rows of a previous frame and initial rows of a current frame may be combined and clocked out together. Similarly, all the undesired pixels at the end of a line of desired pixel data may be all shifted into the transfer section of the CCD together and clocked out by a series of horizontal transfer pulses at the start of the next line as shown in FIG. 5. Various other implementations of this residual charge transfer may be provided for different specific CCD imager designs.

Figure 6:
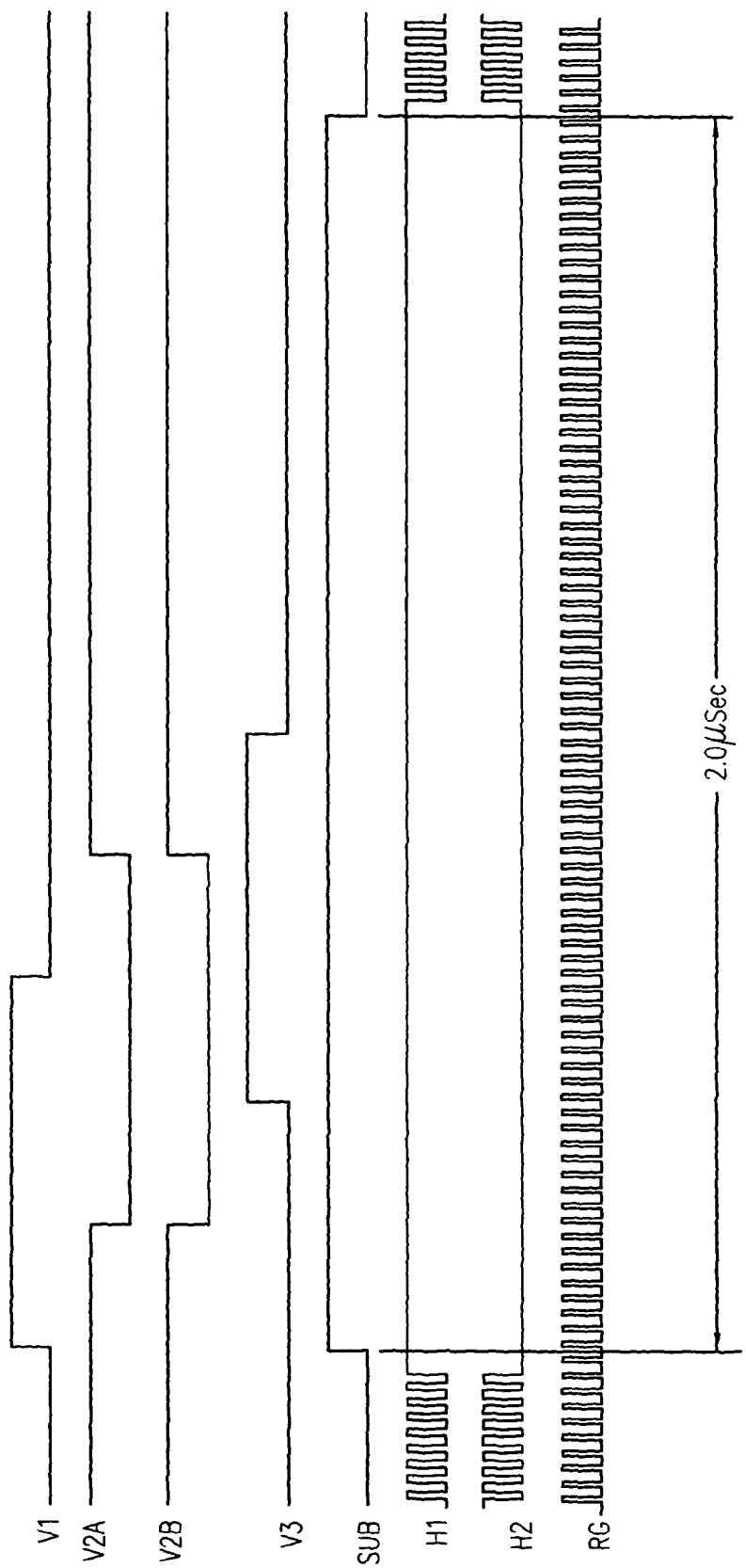
FIG. 6 is a timing diagram illustrating another expanded representation of a timing sequence illustrating horizontal timing pulses (with φSUB pulse)

Another feature of the present invention involves the handling of the φSUB or "electronic shutter" pulse, which erases the charge in the accumulation region of the CCD or imager to decrease the accumulation or exposure time, which is useful in the case of high light intensity, which can cause saturated output. Referring to FIG. 6, the preferred method is to issue a φSUB pulse synchronous to the Vφ sequence. If, as shown in FIG. 6, a φSUB pulse (of nominal 2 microsecond width) is desired to exceed the time of the Vφ sequence, then the horizontal pulses may be held off in time, to keep the φSUB pulse from corrupting the output data. Another possible method may be to pause the horizontal transfer pulses to place the φSUB pulse wherever in the imager output stream that provides the exact exposure time desired, not just during a Vφ sequence.

Figure 7:
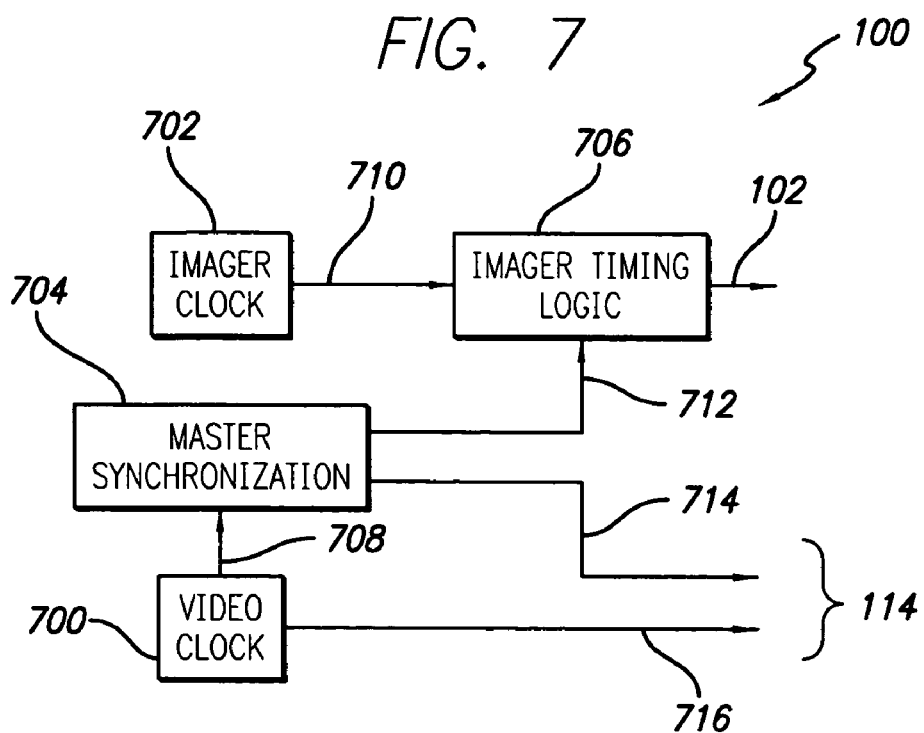
FIG. 7 is a block diagram of a preferred embodiment of a timing generator employed in the imaging system of FIG. 1.

Referring next to FIG. 7, a preferred embodiment of timing generator 100 is illustrated in a block schematic form. The timing generator 100 includes a video clock 700 synchronized to the desired video standard (e.g. SMPTE or VESA standard) which provides a video clock signal on line 716. An imager clock 702 provides a separate imager clock signal on line 710. The imager clock signal is provided to imager timing logic 706. Imager timing logic 706 generates the sequence of timing signals used to read out imager 104 (referring to FIG. 1) and these timing signals are provided as the first set of timing signals 102. For example, imager timing logic 706 may generate the sequence of timing signals illustrated in FIGS. 4-5 for a Sony ICX204AL CCD imager as described. Although the imager clock is generally not synchronous to the video clock, to allow the imager data to be synchronized to the video by the rate converter 108 it is desirable to have an underlying reference clock. This is provided by master synchronization circuit block 704. This circuit block will preferably employ the highest available clock rate which may be the video clock in most applications. Accordingly, as shown, the master synchronization circuit block receives the video clock along line 708 and provides a synchronization signal along lines 712 and 714. The signal along line 712 is used by imager timing logic 706 to align selected imager clock signal edges with the synchronization signal/video clock, preferably implemented as a once-per frame "frame synchronization". The synchronization signal along line 714 is output along with the video clock signal along line 716 as the second set of clock signals 114 described above.

Figure 8:
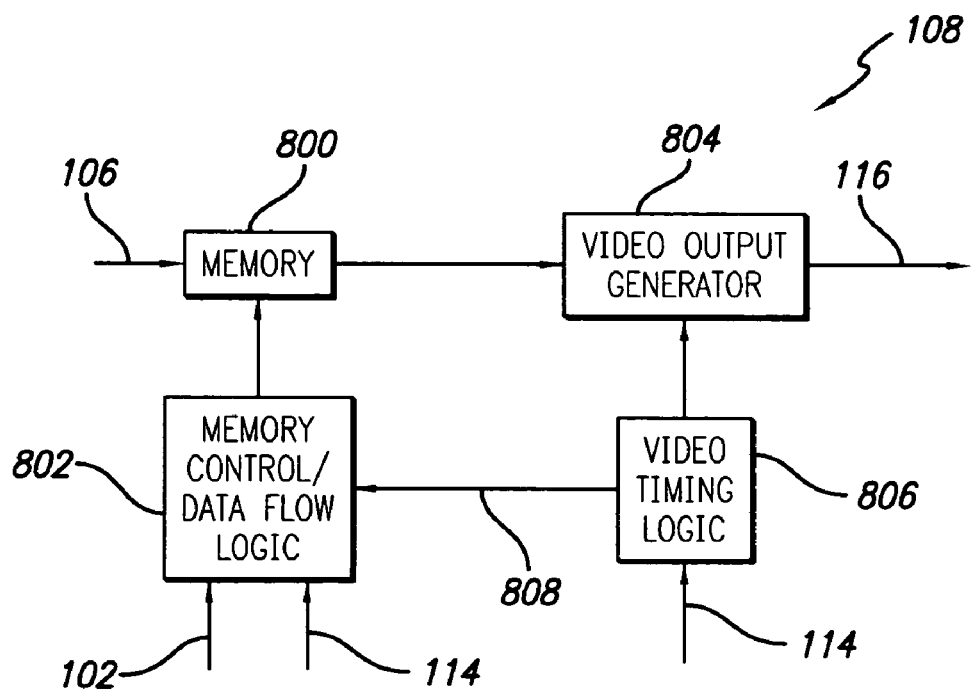
FIG. 8 is a block diagram of a preferred embodiment of the rate converter employed in the imaging system of FIG. 1.

Referring to FIG. 8 a preferred embodiment of the rate converter 108 is illustrated. As shown the rate converter includes a memory 800, which receives the imager data 106 and buffers it temporarily to allow synchronization of the imager data to the video clocking scheme, and rate converter control logic comprising circuit blocks 802, 804 and 806 in the specific illustrated embodiment. Memory 800 may be any suitable memory such as a separate RAM or may incorporate storage available in the video output device. Also, memory 800 may have capacity equal to an entire frame of video data or less than a frame of video data, as long as a seamless video output may be provided by rate converter 108. The reading in and out of data to and from memory 800 is controlled by memory control circuit block 802. This circuit block receives both the imager clock 102 and video clock 114 and the data is clocked into memory 800 at a rate synchronous to the imager rate and clocked out at the asynchronous video rate. Video output generator 804 and video timing logic 806 convert the data output from memory 800 to video format by inserting appropriate blanking data to fill up the blanking time associated with the specific video timing format. During such blanking periods the video timing logic 806 provides a control signal 808 to circuit block 802 to interrupt the read out of actual pixel data from memory 800. The result is that video data 116 may be output at a higher clock rate than image data 106. Also, video data 116 will be synchronized to the desired video output clocking scheme, including blanking intervals of blanking data, whereas imager data 106 will not be synchronous to this scheme and will not include dummy or reference pixel data to be clocked into the rate converter 108.

Figure 9:
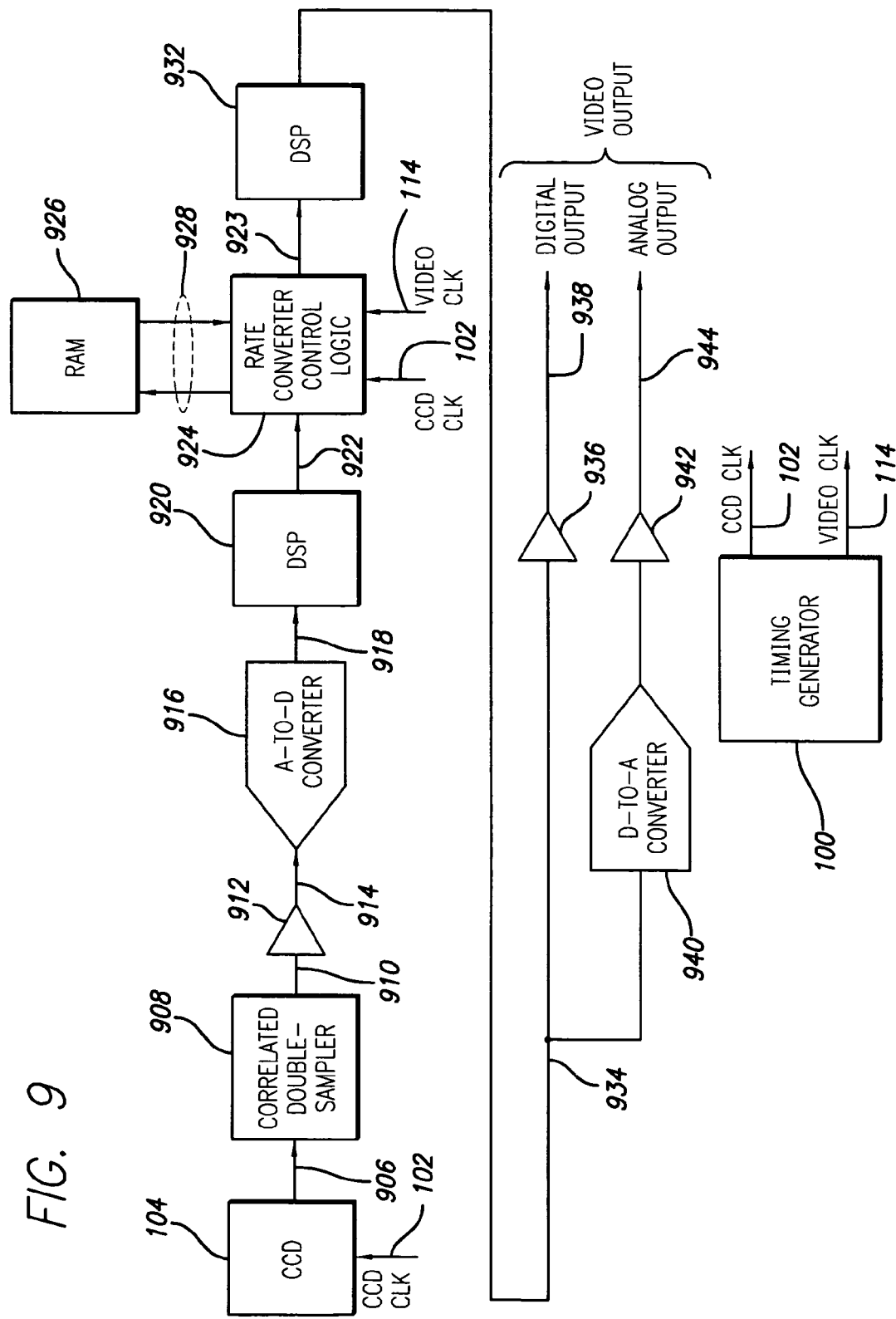
FIG. 9 is a block diagram of an implementation example of a high definition camera system according to the present invention.

FIG. 9 is a block diagram of an implementation example of the system of FIG. 1 as a high definition camera. System synchronization begins with timing generator 100. Timing generator 100 provides a first set of timing signals 102 (CCD clock signal), to CCD 104 to synchronize CCD 104 timing functions such as vertical clock, horizontal clock, and RG clocks. CCD 104 then outputs an encoded video image signal 106 that contains a reference voltage and a data voltage. These voltages are present in every horizontal clock pulse output from CCD 104. Signal 906 is fed to correlated double-sampler 908, which calculates an image signal 910 by comparing the reference and data voltages of signal 906. An optional analog processor 912 receives signal 910. Analog processor 912 may perform any common analog signal processing function, such as amplification, white balance, filtration, etc. The output of analog processor 912 is then fed to analog-to-digital converter 916, which samples signal 914 at a desired frequency for output as digital image data 918. Image data 918 is input to an optional digital signal processor 920, which may perform any common digital signal processing function, such as enhancement, filtration, transformation, etc. typically implemented in a digital camera. Digital signal processor 920 outputs the processed image data 922 to a rate converter, comprising rate converter control logic 924 and memory 926, at a rate synchronized to the CCD clock signal of timing generator 100. The memory 926 may comprise a RAM block which is logically controlled by, and coupled to control logic 924 through data bus 928. RAM block 926 operates as a data buffer while logic 924 converts image data 922 received at the CCD clock rate into video output data 923 that is synchronized to a video clock rate 114. RAM block 926 and control logic 924 thus operate in the same manner as rate converter 108 as described in more detail previously.

The output data 923 may then undergo additional, optional processing by digital signal processor 932. At this point, video data 934 from processor 932 may be output to either of two data lines, depending on whether it is intended for use in a digital or an analog camera. For digital output, data 934 flows to digital drivers 936, where it is amplified and coupled to digital output 938. For analog output, data 934 flows first to a digital-to-analog converter 940. After conversion, the video data is amplified by analog driver 942 and coupled to analog output 944.

Accordingly, the implementation of FIG. 9 provides a low cost high frame rate high definition camera which may be used in HDTV or other high definition applications.

In light of the above, it will be appreciated that the present invention provides an imaging system and method employing a low-cost imager to generate video at much faster frame rates than specified by the manufacturer, up to the standard of 60 frames per second and beyond, if necessary. The present invention further provides an electronic imager that uses the most efficient method of clocking useful data out, thereby increasing its frame rate. The present invention further provides a system and method to synchronize data when an imager clock rate is asynchronous to the video output standard. The present invention further provides a system and method for taking a standard HD CCD or other imager and clock it in such a way that eliminates idle time, bypasses unnecessary clocking of unused lines and pixels, and uses the most efficient methods of clocking the useful data out. The present invention further provides a system and method for eliminating the residual charge of data that is bypassed and does not get transferred out of the imager. The present invention further provides a low-cost, high-quality, high definition video camera that is particularly suited for use in medical, industrial, entertainment, surveillance and broadcast applications. Other aspects and features of the invention will be appreciated by those skilled in the art.

While various embodiments of the invention have been described, it will be apparent to those of ordinary skill in the art that many more embodiments and implementations are possible that are within the scope of this invention. It is understood that such changes in the specific structure shown and described may be made within the scope of the claims, without departing from the spirit of the invention. Also, while the apparatus and method has or will be described for the sake of grammatical fluidity with functional explanations, it is to be expressly understood that the claims, unless expressly formulated using "means for" terminology are not to be construed as necessarily limited in any way by the construction of "means" or "steps" limitations under 35 USC 112, last paragraph. Also, nothing herein is intended to limit or waive the full scope of the meaning of the claims or limit in any way the scope of equivalents of the claims under the judicial doctrine of equivalents.

What is claimed is:

1. An imaging system adapted for outputting a video data signal having a video pixel clock rate and a video frame rate, comprising:
    a timing generator simultaneously providing an imager pixel clock signal and a video pixel clock signal, the imager pixel clock signal having an imager pixel clock rate and an imager frame rate, and the video pixel clock signal having the video pixel clock rate that is greater than the imager pixel clock rate and the video frame rate that is equal to the imager frame rate;
    a standard imager having a nominal clock rate that is lower than the video pixel clock rate of the video data signal, the standard imager having an imager clock input receiving the imager pixel clock signal and a data output which outputs imager data comprising frames of sequential lines of active image data at the imager pixel clock rate; and
    a pixel clock rate converter comprised of a memory buffer coupled to the data output of the standard imager, and a memory control circuit for controlling the writing and reading of image data to and from the memory buffer which is coupled to the timing generator and receiving the imager pixel clock signal and the video pixel clock signal, the pixel clock rate converter receiving the imager data from the standard imager synchronously with the imager pixel clock signal and at a rate equal to the imager pixel clock rate, and outputting buffered image data at a rate equal to the video pixel clock rate that is greater than the imager pixel clock rate.

2. The imaging system of claim 1, wherein the standard imager comprises a pixel array holding pixel data representative of an image captured by the standard imager, the pixel array having a first portion and a second portion.

3. The imaging system of claim 2, wherein the timing generator generates a sequence of timing signals to control the standard imager to skip over the second portion of the pixel array and clock the first portion of the pixel array from the standard imager to the pixel clock rate converter.

4. The imaging system of claim 3, wherein the timing generator generates horizontal timing pulses and vertical timing pulses, and wherein the horizontal timing pulses correspond to the imager pixel clock rate.

5. The imaging system of claim 1, wherein the imager pixel clock signal and the video pixel clock signal are asynchronous to one another.

6. The imaging system of claim 3, wherein the first portion of the pixel array comprises desired active pixels.

7. The imaging system of claim 6, wherein the second portion of the pixel array comprises inactive or dummy pixels.

8. The imaging system of claim 3, wherein the second portion of the pixel array comprises a combination of undesired active pixels and inactive pixels, and the first portion comprises desired active pixels of the pixel array.

9. The imaging system of claim 3, wherein the standard imager is a CCD sensor and electric charge is accumulated by the standard imager for the pixels of the pixel array, and wherein the electric charge associated with the second portion of the pixel array is shifted out of the standard imager simultaneously for groups of plural rows.

10. The imaging system of claim 9, wherein one or more horizontal and vertical timing pulses control the accumulation of electric charge in a transfer portion of the standard imager and the horizontal transfer clock controls the transfer of charge corresponding to plural rows of pixel data out of the standard imager simultaneously.

11. The imaging system of claim 1, wherein the timing generator comprises:
an imager clock generator circuit block outputting an imager clock;
a video clock generator circuit block outputting a video clock;
a master synchronization circuit block; and
an imager timing logic block, coupled to the imager clock generator and master synchronization circuit blocks and outputting said imager pixel clock signal at the imager pixel clock rate.

12. The imaging system of claim 11, wherein the master synchronization circuit block is coupled to the video clock generator circuit block and receives the video clock.

13. The imaging system of claim 12, wherein a rate converter control logic comprises video timing logic coupled to the memory control circuit and to the timing generator and receiving the video pixel clock signal, wherein the video timing logic controls the memory control circuit to interrupt read out of the image data from the memory buffer during blanking intervals of an output video data.

14. The imaging system of claim 13, wherein the rate converter control logic further comprises a video output generator coupled to the memory buffer and the video timing logic, wherein the video output generator receives the output video data from the memory buffer and inserts blanking data during blanking intervals during which the read out of the memory buffer is suspended and outputs video data with actual pixel data and blanking data at the video pixel clock rate.

15. The imaging system of claim 14, wherein the output video data is provided in a VESA standard timing.

16. The imaging system of claim 14, wherein the output video data is provided in a SMPTE HDTV standard timing.

17. A method of providing video data having a video pixel clock rate and a video frame rate, comprising:
providing a standard imager having a nominal clock rate that is lower than the video pixel clock rate and an imager frame rate that is equal to the video frame rate;
clocking frames of image data from the standard imager using an imager pixel clock signal at an imager pixel clock rate;
converting the image data with a memory buffer to the video data at the video pixel clock rate simultaneously greater than the imager pixel clock rate, with the imager frame rate being equal to the video frame rate.

18. The method of claim 17, wherein converting the image data to the video data further comprises writing the image data into the memory buffer at a rate synchronous to the imager pixel clock rate, and reading the image data out of the memory buffer at a different clock rate.

19. The method of claim 18, wherein converting the image data to the video data further comprises inserting blanking data, corresponding to blanking intervals of the video data, into the image data.

20. The method of claim 19, wherein converting the image data to the video data further comprises suspending read out of the image data from the memory buffer during said inserting of blanking pixel data.

21. The method of claim 17, wherein the imager pixel clock signal is asynchronous to the video data.

22. The method of claim 21, wherein the video data is output in a VESA standard timing.

23. The method of claim 21, wherein the video data is output in a SMPTE HDTV standard timing.

* * * * *